(12) United States Patent
Yonemura et al.

(10) Patent No.: US 11,656,026 B2
(45) Date of Patent: May 23, 2023

(54) COMPRESSING SYSTEM, AND GAS COMPRESSING METHOD

(71) Applicant: MITSUBISHI HEAVY INDUSTRIES COMPRESSOR CORPORATION, Tokyo (JP)

(72) Inventors: Naoto Yonemura, Hiroshima (JP); Hiroyuki Miyata, Hiroshima (JP); Hideki Nagao, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 113 days.

(21) Appl. No.: 16/838,416

(22) Filed: Apr. 2, 2020

(65) Prior Publication Data

US 2020/0248961 A1 Aug. 6, 2020

Related U.S. Application Data

(62) Division of application No. 13/982,780, filed as application No. PCT/JP2012/073443 on Sep. 13, 2012, now abandoned.

(51) Int. Cl.
  *F25J 1/00* (2006.01)
  *F25J 3/06* (2006.01)
  (Continued)

(52) U.S. Cl.
  CPC ............ *F25J 1/0027* (2013.01); *F04D 17/12* (2013.01); *F25J 3/0266* (2013.01); *F25J 3/067* (2013.01);
  (Continued)

(58) Field of Classification Search
  CPC .................. F25J 2230/80; F25J 1/0027; F25J 1/0042–0045; F25J 1/0202; F25J 1/0221;
  (Continued)

(56) References Cited

U.S. PATENT DOCUMENTS

| | | |
|---|---|---|
| 6,220,053 B1 | 4/2001 | Hass, Jr. |
| 6,779,361 B1 | 8/2004 | Skare |

(Continued)

FOREIGN PATENT DOCUMENTS

| | | |
|---|---|---|
| CN | 101959578 | 1/2011 |
| EP | 2 476 476 A1 | 7/2012 |

(Continued)

OTHER PUBLICATIONS

International Search Report dated Dec. 18, 2012 in International (PCT) Application No. PCT/JP2012/073443.

(Continued)

*Primary Examiner* — Frantz F Jules
*Assistant Examiner* — Webeshet Mengesha
(74) *Attorney, Agent, or Firm* — Wenderoth, Lind & Ponack, L.L.P.

(57) ABSTRACT

A compressing system includes a compression section that compresses a target gas to an intermediate pressure, which is equal to or higher than a critical pressure and lower than a target pressure to generate an intermediate supercritical fluid, a cooling section that cools the intermediate supercritical fluid generated in the compression section to near a critical temperature to generate an intermediate supercritical pressure liquid, and a pumping section that compresses the intermediate supercritical pressure liquid generated in the cooling section to a pressure that is equal to or higher than the target pressure. At least one of the intermediate supercritical pressure liquid compressed in the pumping section, a low-temperature liquid generated by extracting the intermediate supercritical pressure liquid on the upstream side of the pumping section to reduce pressure to near the critical pressure, and an external cooling medium is used as a cooling medium in the cooling section.

3 Claims, 9 Drawing Sheets

(51) Int. Cl.
*F25J 3/02* (2006.01)
*F04D 17/12* (2006.01)

(52) U.S. Cl.
CPC ........ *F25J 2215/04* (2013.01); *F25J 2230/04* (2013.01); *F25J 2230/20* (2013.01); *F25J 2230/80* (2013.01); *F25J 2235/80* (2013.01); *F25J 2270/02* (2013.01); *F25J 2270/80* (2013.01); *Y02C 20/40* (2020.08)

(58) Field of Classification Search
CPC ........ F25J 1/0224; F25J 1/0201; F25J 1/0279; F25J 2270/02
See application file for complete search history.

(56) References Cited

U.S. PATENT DOCUMENTS

| | | |
|---|---|---|
| 8,512,440 B2 | 8/2013 | Monk et al. |
| 2008/0156035 A1 | 7/2008 | Aspelund |
| 2011/0041686 A1* | 2/2011 | Monk ..................... C01B 32/50 95/39 |
| 2012/0111051 A1* | 5/2012 | Kulkarni .............. B01D 53/229 62/619 |
| 2013/0340472 A1 | 12/2013 | De Cayeux |

FOREIGN PATENT DOCUMENTS

| | | |
|---|---|---|
| JP | 1-222194 | 9/1989 |
| JP | 4-359785 | 12/1992 |
| JP | 5-280860 | 10/1993 |
| JP | 2008-506620 | 3/2008 |
| JP | 2010-266154 | 11/2010 |
| JP | 2010266154 A * | 11/2010 |
| JP | 2011-137557 | 7/2011 |
| JP | 2013-124666 | 6/2013 |
| WO | 2011/101296 | 8/2011 |
| WO | 2012/140350 | 10/2012 |
| WO | 2012/140369 | 10/2012 |

OTHER PUBLICATIONS

Written Opinion of the International Searching Authority dated Dec. 18, 2012 in International (PCT) Application No. PCT/JP2012/073443.
Thomas Winter et al., Special Section-CO2 Compressor Technology, "The Right Solution for CO2 Compression-Integrally Geared Compressors from Siemens", Carbon Capture Journal, pp. 22-24, Sep.-Oct. 2009.
Marco Minotti, "CO2 Compression Capabilities", Enabling Technologies, pp. 1-15, 2009.
Chinese Office Action dated Jul. 24, 2014 in corresponding Chinese Patent Application No. 201280005501.8 with English translation.
Japanese Office Action dated Sep. 24, 2014 in corresponding Japanese Patent Application No. 2013-519659 with English translation.
Korean Office Action dated Oct. 23, 2014 in corresponding Korean Patent Application No. 10-2013-7016650 with English translation.
Korean Decision for Grant of patent dated Jan. 13, 2015 in corresponding Korean Patent Application No. 10-2013-7016650 with English translation.
JP 2020226154 Translation issued Nov. 2010.
Japanese Notice of Allowance dated Sep. 15, 2015 in corresponding Japanese Patent Application No. 2013-519659 with English Translation.
Extended European Search Report dated Dec. 15, 2015 in corresponding Emopean Patent Application No. 12866992.6.

* cited by examiner

COMPRESSING SYSTEM, AND GAS COMPRESSING METHOD

FIELD OF THE INVENTION

The present invention relates to a compressing system and a gas compressing method.

BACKGROUND ART

Compressing systems are apparatuses that compress a target gas to a target pressure.

Here, in recent years, problems, such as global warming, have become obvious according to an increase in the amount of emissions of carbon dioxide known as a greenhouse gas. Particularly, a large amount of carbon dioxide is contained in emission gases of thermoelectric power plants, and there is a known technique of compressing carbon dioxide by the compressing system, storing carbon dioxide in the ground on land or in the ground on the sea bottom, thereby reducing carbon dioxide emission in the atmosphere after carbon dioxide is separated and collected from the emission gases.

In such a compressing system, carbon dioxide of target temperature and pressure that is optimal for transportation and storage is obtained by compressing carbon dioxide sequentially by compressors configured in multiple stages, and cooling carbon dioxide brought into the state of supercritical pressure and temperature or higher by an aftercooler.

However, in the system with only the compressors that perform the compressing in such a gaseous state, an aftercooler with ultra-high pressure and large capacity is required in order to obtain carbon dioxide of the target temperature and pressure, and the operation efficiency and reliability of the overall compressing system will fall since the compressing system comes into an ultra-high pressure compression region.

Here, for example, PTL 1 discloses a compressing system (a carbon dioxide liquefier) that does not use the above after cooler. In this compressing system, a compressor is provided on a front-stage side, a pump is provided on a rear-stage side, and carbon dioxide is sequentially compressed. Additionally, when carbon dioxide is introduced from the compressor to the pump, the efficiency of liquefaction of carbon dioxide is increased using the refrigeration of carbon dioxide that is compressed by the pump and brought into a liquid state of supercritical pressure.

ACCORDING ART DOCUMENTS

Patent Documents

[Patent Document 1] Japanese Unexamined Patent Application, First Publication No. 2010-266154

DISCLOSURE OF THE INVENTION

Problems to be Solved by the Invention

However, in the compressing system of the above PTL 1, the after-cooler becomes unnecessary by combining the compressor and the pump, and power can be reduced consequently. However, the gas (carbon dioxide) is compressed only to a pressure that is lower than a critical pressure by the compressor, is cooled, liquefied, and introduced into the pump. For this reason, the amount of refrigeration required for liquefaction becomes greatly enlarged, temperature becomes low, and therefore great power is required for an external refrigerating cycle. For this reason, there is room for improvement in the operation efficiency as a whole.

The invention provides a compressing system and a gas compressing method that further reduces power and improves operation efficiency.

Means for Solving the Problems

A compressing system according to a first aspect of the invention is a compressing system that compresses a target gas to a pressure that is equal to or higher than a target pressure higher than a critical pressure. The compressing system includes a compression section that compresses the target gas to an intermediate pressure, which is equal to or higher than the critical pressure and is lower than the target pressure to generate an intermediate supercritical fluid; a cooling section that cools the intermediate supercritical fluid generated in the compression section to near a critical temperature to generate an intermediate supercritical pressure liquid; a pumping section that compresses the intermediate supercritical pressure liquid generated in the cooling section to a pressure that is equal to or higher than the target pressure; and a heating section that heats the intermediate supercritical pressure liquid compressed in the pumping section to near the critical temperature. The cooling section has a main cooling part that performs heat exchange with the heating section to cool the intermediate supercritical fluid.

According to such a compressing system, a liquid at a pressure that is equal to or higher than the target pressure is obtained by performing compression on a front-stage side in the compression section, and performing compression by the pumping of the intermediate supercritical fluid on a rear-stage side where pressure is higher than the front-stage side in the pumping section. Thereafter, the supercritical fluid of the target pressure and temperature can be obtained by finally heating the intermediate supercritical fluid to the critical temperature or higher by the heating section. That is, in a case where pressurization is performed, for example, by a compressor even on the rear-stage side where pressure is higher than the front-stage side, a number of high-pressure gas seals or a number of compressor casings for high pressure are required. However, since these high-pressure countermeasures become unnecessary by adopting the pumping section on the rear-stage side, cost reduction and reliability improvement are possible, the after-cooler that cools the supercritical fluid after pressurization is also unnecessary, and power reduction is possible.

Here, since the cooling section cools the intermediate supercritical fluid brought into the state of a pressure that is equal to or higher than the critical pressure by the compression section to generate the intermediate supercritical pressure liquid, it is possible to liquefy the intermediate supercritical fluid while keeping the amount of heat required for cooling markedly low as compared to a case where cooling is performed in the state of being lower than the critical pressure.

Additionally, the intermediate supercritical fluid compressed in the compression section can be cooled by the main cooling part in the cooling section to generate the intermediate supercritical pressure liquid and introduce the intermediate supercritical pressure liquid into the pumping section. Additionally, the intermediate supercritical pressure liquid can be more efficiently heated to the critical temperature or higher to obtain the supercritical fluid of the target pressure and temperature by performing heat exchange with the heating section using heat recovered during the cooling of the intermediate supercritical fluid.

Moreover, a compressing system according to a second aspect of the invention may further includes an extracting and decompression section that is provided between the cooling section and the pumping section in the first aspect to extract the intermediate supercritical pressure liquid to reduce pressure to near the critical pressure to generate a low-temperature liquid, and the main cooling part may perform heat exchange with the low-temperature liquid generated in the extracting and decompression section to cool the intermediate supercritical fluid.

By effectively using the refrigeration of the intermediate supercritical pressure liquid itself introduced into the pumping section by such an extracting and decompression section, the intermediate supercritical pressure liquid introduced into the pumping section can be reliably generated without separately installing a condenser required to generate the intermediate supercritical pressure liquid from the intermediate supercritical fluid.

Additionally, a compressing system according to a third aspect of the invention is a compressing system that compresses a target gas to a pressure that is equal to or higher than a target pressure higher than a critical pressure. The compressing system includes a compression section that compresses the target gas to an intermediate pressure, which is equal to or higher than the critical pressure and is lower than the target pressure to generate an intermediate supercritical fluid; a cooling section that cools the intermediate supercritical fluid generated in the compression section to near a critical temperature to generate an intermediate supercritical pressure liquid; a pumping section that compresses the intermediate supercritical pressure liquid generated in the cooling section to a pressure that is equal to or higher than the target pressure; and an extracting and decompression section that is provided between the cooling section and the pumping section to extract the intermediate supercritical pressure liquid to reduce pressure to near the critical pressure to generate a low-temperature liquid. The cooling section has a main cooling part that performs heat exchange with the low-temperature liquid generated in the extracting and decompression section to cool the intermediate supercritical fluid.

According to such a compressing system, since high-pressure countermeasures become unnecessary when the pumping section is adopted on a rear-stage side as compared to the case where the compressor, for example, is applied on a rear-stage side, cost reduction and reliability improvement are possible, the after-cooler that cools the supercritical fluid after pressurization is also unnecessary, and power reduction is possible. Additionally, the intermediate supercritical fluid can be liquefied in the cooling section while keeping the amount of heat required for cooling markedly low as compared to a case where cooling is performed in the state of being lower than the critical pressure. Moreover, by virtue of the extracting and decompression section, the refrigeration of the intermediate supercritical pressure liquid itself introduced into the pumping section can be used in the main cooling part in the cooling section, and the intermediate supercritical fluid compressed in the compression section can be cooled without separately installing a condenser to generate the intermediate supercritical pressure liquid and the intermediate supercritical pressure liquid can be introduced into the pumping section.

Moreover, in a compressing system according to a fourth aspect of the invention, a gas or supercritical fluid, which is heated, evaporated, and generated when heat exchange with the low-temperature liquid generated in the extracting and decompression section in the second or third aspect is performed in the main cooling part, may be returned to an equivalent pressure part in the compression section.

In this way, the low-temperature liquid, which is extracted and generated in the extracting and decompression section, is not discharged to the outside, and a gas or supercritical fluid generated from the low-temperature liquid can be returned to the equivalent pressure part of the compressor equivalent to the pressure of the gas or supercritical fluid. Therefore, the efficiency of the overall compressing system can be further improved.

Moreover, in a compressing system according to a fifth aspect of the invention, the cooling section in the first to fourth aspects may have a pre-cooling part that performs heat exchange with a cooling medium to cool the intermediate supercritical fluid to send the intermediate supercritical fluid to the main cooling part.

Since the intermediate supercritical fluid can be pre-cooled by such a pre-cooling part, the amount of refrigeration required by the main cooling part can be reduced.

A gas compressing method for gas according to a sixth aspect of the invention is a gas compressing method for a target gas to a pressure that is equal to or higher than a target pressure higher than a critical pressure. The gas compressing method includes a compression step of compressing the target gas to an intermediate pressure, which is equal to or higher than the critical pressure and is lower than the target pressure to generate an intermediate supercritical fluid; a cooling step of cooling the intermediate supercritical fluid generated in the compression step to near a critical temperature to generate an intermediate supercritical pressure liquid; and a pumping step of compressing the intermediate supercritical pressure liquid generated in the cooling step to a pressure that is equal to or higher than the target pressure. The intermediate supercritical fluid is cooled in the cooling step, using as a cooling medium at least one of the intermediate supercritical pressure liquid compressed in the pumping step, a low-temperature liquid generated by extracting the intermediate supercritical pressure liquid before the start of the pumping step and by reducing pressure to near the critical pressure, and an external cooling medium.

According to such a gas compressing method for gas, the pumping step is provided after the compression step. Thereby, since high-pressure countermeasures become unnecessary as compared to a case where compressing of gas is performed to a pressure that is equal to or higher than the target pressure, for example, only by the compression step, cost reduction is possible, and the after-cooler that cools the supercritical fluid after the compressing is also unnecessary. Therefore, power reduction is possible. Hence, since the intermediate supercritical fluid brought into the state of a pressure that is equal to or higher than the critical pressure is cooled in the cooling step to generate the intermediate supercritical pressure liquid, it is possible to liquefy the intermediate supercritical fluid while keeping the amount of heat required for cooling markedly low as compared to a case where cooling is performed in the state of being lower than the critical pressure. Moreover, in the cooling step, the intermediate supercritical fluid can be efficiently cooled by the intermediate supercritical pressure liquid, the low-temperature liquid, the external cooling medium, or the like.

Effects of the Invention

According to the compressing system and gas compressing method of the invention, by combining the compression section and the pumping section and cooling the intermediate supercritical fluid in the state of a pressure that is equal to or higher than the critical pressure in the cooling section, power is further reduced, thereby operation efficiency is improved.

MODE FOR CARRYING OUT THE INVENTION

A compressing system 1 according to a first embodiment of the invention will be described below. In the present embodiment, the compressing system 1 is a geared compressor into which a pump that compresses a gas of carbon dioxide F as a target gas to predetermined pressure and temperature so as to be capable of being stored in the ground on land or in the ground on the sea bottom is assembled.

In addition, the geared compressor is a compressor of a multi-axis and multi-stage configuration in which a plurality of impellers are interlocked via gears.

Figure 1:
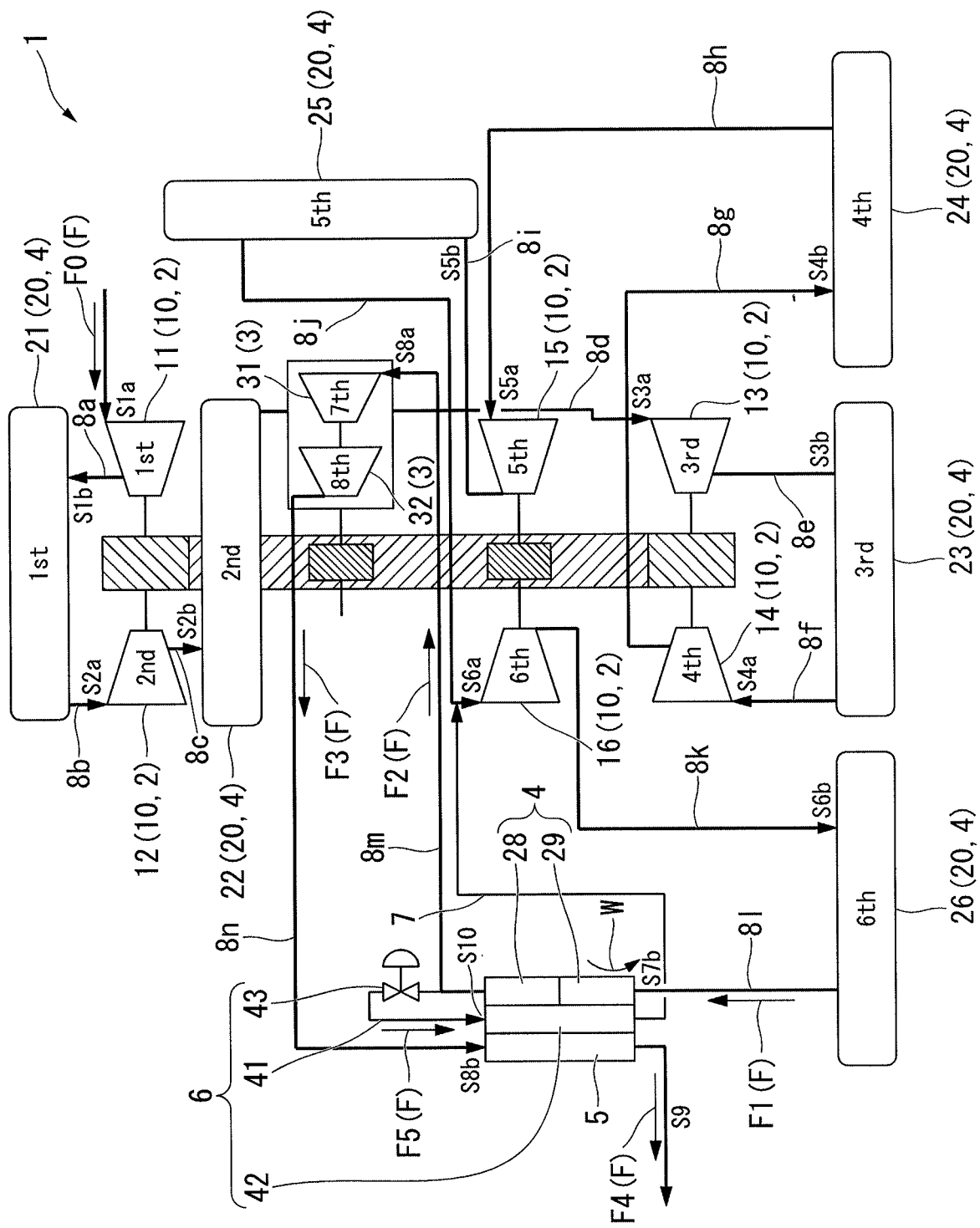
FIG. 1 is a system diagram illustrating the outline of a compressing system according to a first embodiment of the invention.

As shown in FIG. 1, the compressing system 1 includes a compression section 2 that takes in and compresses the carbon dioxide F that is a target gas, a pumping section 3 that is provided on a rear-stage side of the compression section 2 and compresses the carbon dioxide F, and a cooling section 4 that is provided between the compression section 2 and the pumping section 3.

Moreover, the compressing system 1 includes a heating section 5 that heats the carbon dioxide F that is compressed in the pumping section 3, an extracting and decompression section 6 that is provided between the cooling section 4 and the pumping section 3 and extracts the carbon dioxide F, and a bypass channel 7 that returns the carbon dioxide F from the extracting and decompression section 6 to the compression section 2.

The compression section 2 has a plurality of impellers 10 that are provided in multiple stages (six stages in the present embodiment), and a plurality of intercoolers 20 each of which is provided between the impellers 10 or between the compression section 2 and the cooling section 4. The compression section 2 compresses the taken-in carbon dioxide F to a pressure state of an intermediate pressure that is equal to or higher than a critical pressure and is lower than a target pressure while repeating compression and cooling of carbon dioxide as an introduction gas F0, and generates an intermediate supercritical fluid F1. The critical pressure of the carbon dioxide F is 7.4 [MPa]. The target pressure is set to a value higher than the critical pressure, for example, 15 [MPa]. Additionally, the intermediate pressure of the intermediate supercritical fluid F1 generated in the compression section 2 is set to, for example, 10 [MPa].

Here, the compression section 2 is constituted of a first-stage compression impeller 11, a first intercooler 21, a second-stage compression impeller 12, a second intercooler 22, a third-stage compression impeller 13, a third intercooler 23, a fourth-stage compression impeller 14, a fourth intercooler 24, a fifth-stage compression impeller 15, a fifth intercooler 25, a sixth-stage compression impeller 16, and a sixth intercooler 26, which are provided in order from the upstream side toward the downstream side where the carbon dioxide F is taken in and flows, and these impellers and intercoolers are mutually connected by conduits 8a, 8b, 8c, 8d, 8e, 8f, 8g, 8h, 8i, 8j, 8k, 8l, 8m, and 8n.

The cooling section 4 is connected to the downstream side of the sixth intercooler 26 by the conduit 8l, cools the intermediate supercritical fluid F1 generated from the sixth-stage compression impeller 16 that is a final stage of the compression section 2 to near a critical temperature to liquefy the intermediate supercritical fluid F1, and generates an intermediate supercritical pressure liquid F2.

The cooling section 4 has a pre-cooling part 29 that pre-cools the intermediate supercritical fluid F1 generated in the compression section 2 and a main cooling part 28 that further cools the intermediate supercritical fluid F1 cooled in the pre-cooling part 29 to generate the intermediate supercritical pressure liquid F2.

The pre-cooling part 29 is a heat exchanger that pre-cools the intermediate supercritical fluid F1 by an external cooling medium W.

The main cooling part 28 introduces a low-temperature liquid F5 from the extracting and decompression section 6 to be described below, and cools the intermediate supercritical fluid F1 using this low-temperature liquid F5 as a refrigerant. In the present embodiment, with respect to between the main cooling part 28 and the heating section 5, heating in the heating section 5 is performed by the heat obtained by cooling the intermediate supercritical fluid F1 in the main cooling part 28, and the main cooling part 28 and the heating section 5 constitutes one heat exchanger.

Here, although the cooling capacity of the pre-cooling part 29 varies depending on the temperature, flow rate, or the like of the external cooling medium W taken in from the outside in the pre-cooling part 29, in the present example, the intermediate supercritical fluid F1 generated in the compression section 2 is cooled to a region of transition to a liquid only by the sixth intercooler 26 without using the pre-cooling part 29, and then is liquefied by the main cooling part 28 to generate the intermediate supercritical pressure liquid F2.

Additionally, when the intermediate supercritical fluid F1 is cooled to near the critical temperature in the cooling section 4, the fluid is preferably cooled to a temperature that is ±20[° C.] from the critical temperature, more preferably cooled to a temperature that is ±15[° C.] from the critical temperature, and most preferably to a temperature that is ±10[° C.] from the critical temperature.

The pumping section 3 is connected to the downstream side of the cooling section 4 by the conduit 8m, introduces the intermediate supercritical pressure liquid F2 generated by passing through the cooling section 4 to raise the pressure of the liquid to a pressure state of the target pressure to generate a target pressure liquid F3. In the present embodiment, the pumping section 3 has a two-stage configuration including a first-stage pump impeller 31 and a second-stage pump impeller 32.

The heating section 5 is provided so as to be connected to the downstream side of the pumping section 3 by the conduit 8n, introduces the target pressure liquid F3 from the pumping section 3 to generate a target supercritical fluid F4 with a critical temperature (31.1[° C.]) or higher. As described above, the heating section 5 constitutes the heat exchanger together with the main cooling part 28 of the cooling section 4.

That is, in the heating section 5, the target pressure liquid F3 is heated by condensation heat, which is obtained by cooling the intermediate supercritical fluid F1 in the main cooling part 28, by performing heat exchange between the heating section 5 and the main cooling part 28.

The extracting and decompression section 6 is provided between the main cooling part 28 and the pumping section 3, and cools the intermediate supercritical fluid F1 in the main cooling part 28 by the low-temperature liquid F5 obtained by extracting a portion of the intermediate supercritical pressure liquid F2 from the main cooling part 28, and the low-temperature liquid F5 is heated.

Specifically, the extracting and decompression section 6 has a branch conduit 41 that has one end connected to the conduit 8m so as to branch from the conduit 8m between the main cooling part 28 and the pumping section 3, a heat exchange part 42 that has the other end of the branch conduit 41 connected thereto and performs heat exchange with the main cooling part 28, and a valve 43 that is provided at a halfway position of the branch conduit 41.

The valve 43 performs pressure reduction on the extracted intermediate supercritical pressure liquid F2 by the Joule-Thomson effect by adjusting the opening degree thereof to generate the low-temperature liquid F5. Although this pressure reduction is performed to near the critical pressure, the pressure is preferably reduced to a pressure that is ±2 [MPa] from the critical pressure, the pressure is more preferably reduced to a pressure that is ±1.5 [MPa] from the critical pressure, and the pressure is most preferably reduced to a pressure that is ±1 [MPa] from the critical pressure.

The bypass channel 7 returns the low-temperature liquid F5 from the extracting and decompression section 6 to the upstream side of the sixth-stage compression impeller 16 of the compression section 2. That is, the bypass channel 7 has one end connected to the heat exchange part 42 of the extracting and decompression section 6 and has the other end connected to the conduit 8j between the sixth-stage compression impeller 16 and the fifth intercooler 25.

Next, an aspect (a compressing method of the carbon dioxide F) of state changes of the carbon dioxide F will be described with reference to the P-h diagram of FIG. 2.

Figure 2:
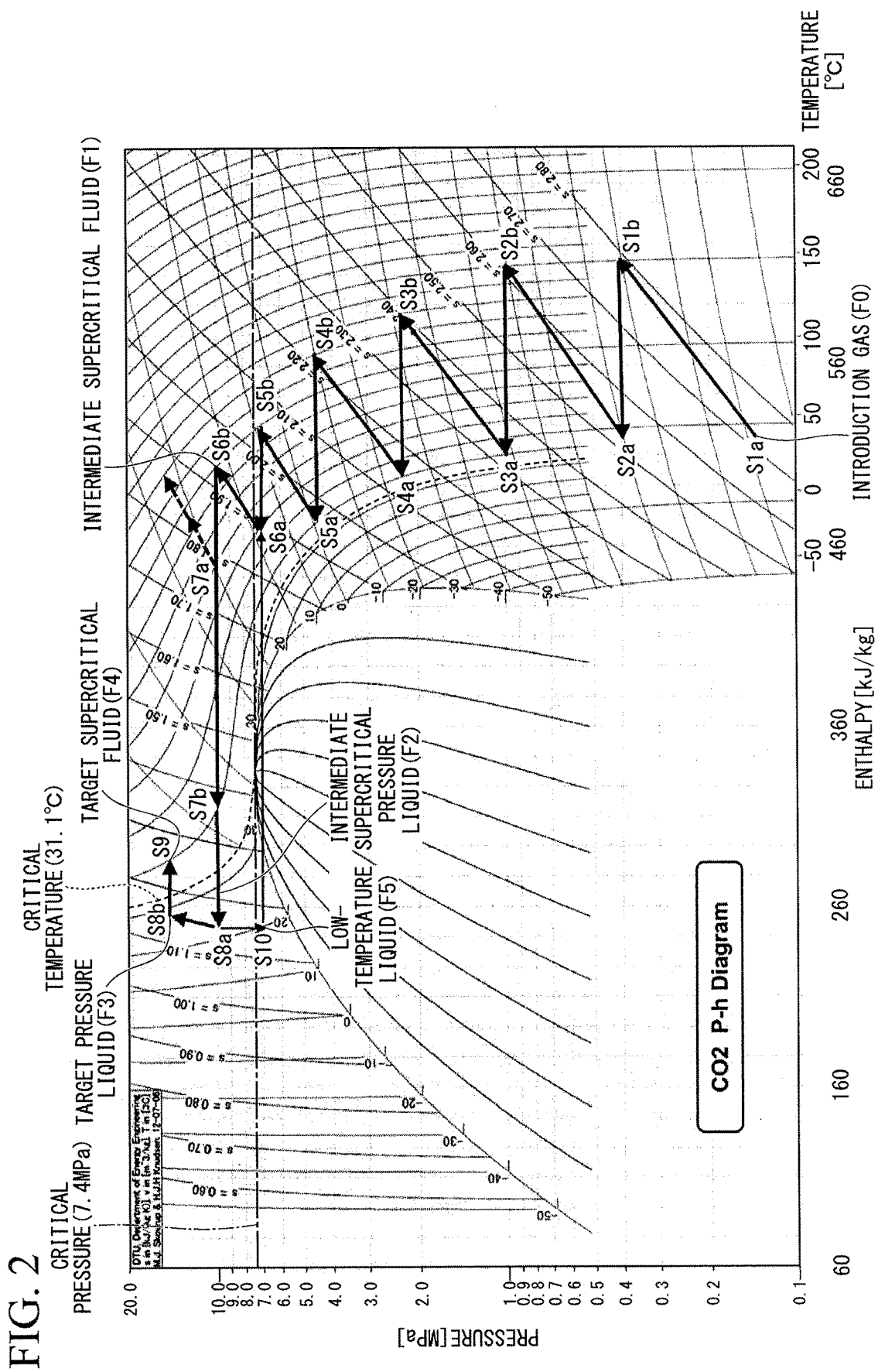
FIG. 2 is a P-h diagram illustrating the state of carbon dioxide regarding the compressing system according to the first embodiment of the invention.

In the compression section 2, as shown by a solid-line arrow of FIG. 2, the introduction gas F0 (state S1a) introduced into the first-stage compression impeller 11 is compressed by the first-stage compression impeller 11, and becomes a state S1b of higher pressure and higher temperature than the state S1a. Thereafter, the gas is isobarically cooled by the first intercooler 21 and the state thereof becomes a state S2a. By repeating compression and cooling in this way, state changes of state S2b→state S3a→state S3b→state S4a→state S4b→state S5a→state S5b→state S6a→state S6b→state S7a→state S7b are made, and the state of the intermediate supercritical fluid F1 at a pressure higher than the critical pressure is given (compression process).

Thereafter, the intermediate supercritical fluid F1 that is brought into the state S7b is introduced into the pre-cooling part 29. Although the intermediate supercritical fluid F1 can be further cooled in the isobaric state in the pre-cooling part 29, and the temperature thereof can be lowered (cooling process), the pre-cooling part 29 is not used in the present example.

The intermediate supercritical fluid F1 is isobarically cooled at the supercritical pressure by the main cooling part 28, and is brought into a state S8a of the critical temperature or lower, and the intermediate supercritical fluid F1 is phase-changed to the intermediate supercritical pressure liquid F2, and is introduced into the pumping section 3 (cooling process).

In the pumping section 3, the intermediate supercritical pressure liquid F2 of the state S8a is compressed to a target pressure where storage in the ground on land or in the ground on the sea bottom is allowed, and is raised in temperature, and the liquid becomes the target pressure liquid F3 in a state S8b (pumping process). Thereafter, by heating the target pressure liquid F3 by the heating section 5, the target pressure liquid F3 is isobarically raised in temperature to the critical temperature or higher, and is brought into a final state S9 where the carbon dioxide F is allowed to be stored in the ground on land or in the ground on the sea bottom.

Here, a portion of the intermediate supercritical pressure liquid F2 that is brought into the state S8a in the main cooling part 28 is extracted by opening the valve 43 of the extracting and decompression section 6. The extracted intermediate supercritical pressure liquid F2 is reduced in pressure, and becomes the low-temperature liquid F5 in a state S10. The pressure in the state S10 becomes a pressure that is equivalent to a pressure on the upstream side of the sixth-stage compression impeller 16 and on the downstream side of the fifth intercooler 25. Additionally, the low-temperature liquid F5 is heated by heat exchange with the cooling sections 4, is evaporated with an isobaric state being maintained, and becomes a gas or supercritical fluid of the state S6a on the upstream side of the sixth-stage compression impeller 16. This gas or supercritical fluid is returned to the upstream side of the sixth-stage compression impeller 16 by the bypass channel 7, and is mixed into the intermediate supercritical fluid F1 that flows through the compression section 2.

According to such a compressing system 1, first, compression of the carbon dioxide F in a front stage is performed in the compression section 2, compressing in a rear stage where the carbon dioxide F has a higher pressure than the front stage is performed in the pumping section 3, thereby generating the target pressure liquid F3. Thereafter, the target pressure liquid F3 is finally heated to the critical temperature or higher by the heating section 5, so that the target supercritical fluid F4 capable of being stored in the ground on land or in the ground on the sea bottom can be obtained.

Here, if the same impellers as those of the compression section 2 are also applied to portions on the rear-stage side that has a higher pressure, there are problems in that a number of high-pressure gas seals or a number of compressor casings for high pressure are required, reliability decreases, and costs rise. Additionally, in order to cope with such a high-pressure state, it is necessary to take measures, such as increasing the shaft diameters of the impellers or reducing the rotation speeds of the impellers, and there is a problem in that reliability and operation efficiency decrease.

In this regard, in the present embodiment, the pumping section 3 is adopted on a high-pressure side. Since a liquid is compressed in the pumping section 3, when the liquid is compressed to a high-pressure state (about 15 to 60 [MPa]), a target fluid is easily sealed. Therefore, this is extremely advantageous, the cost increase as described above can be avoided, and the problems of reliability and operation efficiency can also be solved.

Moreover, if the same impellers as those of the compression section 2 are also applied to the rear-stage side that has a higher pressure, cooling in the sixth intercooler 26 stops in the state S7a in order to avoid compression in a transition region where characteristics become unstable. As a result, as shown by a dotted line of FIG. 2, the supercritical fluid after the compressing is brought into a state where the temperature thereof is high compared to the target supercritical fluid F4. Accordingly, in order to obtain the target supercritical fluid F4, an after-cooler or the like that performs cooling after the compression is further required.

Even in this regard, in the present embodiment, the above after-cooler or the like is unnecessary, and the power for operating this after-cooler can be reduced.

Additionally, in the cooling section 4, the intermediate supercritical fluid F1 brought into the state of the critical pressure or higher by the compression section 2 is cooled and is turned into the intermediate supercritical pressure liquid F2.

Here, according to the P-h diagram shown in FIG. 2, in a region where pressure is lower than the critical pressure, isothermal lines rise so as to be substantially parallel to the vertical axis (pressure), and the intervals between the isothermal lines become narrow. On the other hand, in a transition region that has a pressure equal to or higher than the critical pressure and is near the critical temperature, the isothermal lines become substantially parallel to the horizontal axis (enthalpy), and the intervals between the isothermal lines becomes wide. Accordingly, in the transition region, a larger enthalpy change occurs with a smaller temperature change when the state of the carbon dioxide F changes in the isobaric state.

Hence, in a case where the intermediate supercritical fluid F1 is cooled in the state of the critical pressure or higher as in the present embodiment, it is possible to liquefy the intermediate supercritical fluid F1 while keeping the amount of heat required for cooling low as compared to a case where the intermediate supercritical fluid F1 is cooled in the state of being lower than the critical pressure.

Additionally, the intermediate supercritical fluid F1 is first cooled to the transition region with water cooling only by the sixth intercooler 26. Here, since the intermediate supercritical fluid F1 is in the state near the critical pressure and the critical temperature, as described above, a larger enthalpy change occurs with a small temperature change, and most of the amount of refrigeration required for the liquefaction of the intermediate supercritical fluid F1 can be obtained only through water cooling.

Figure 3:
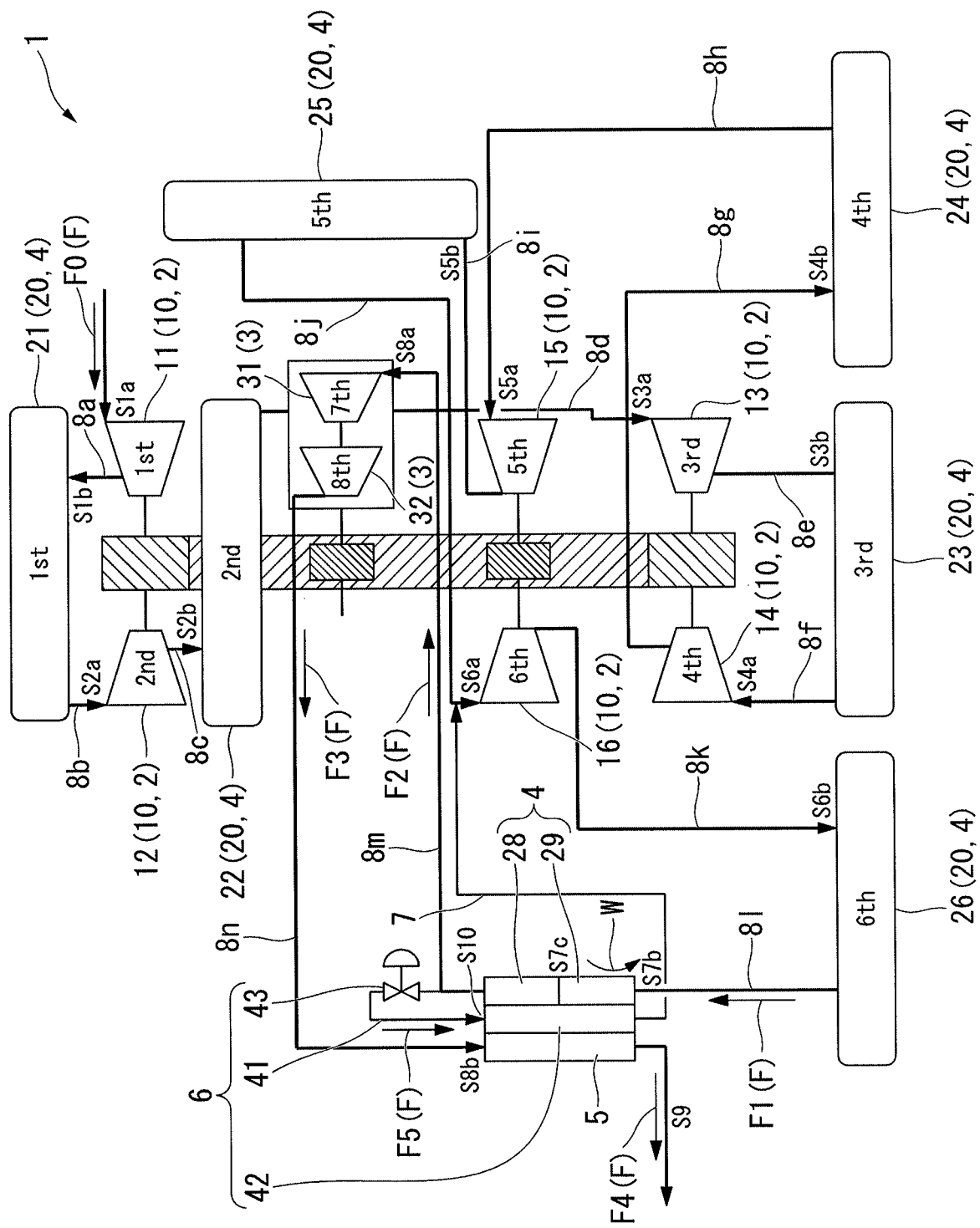
FIG. 3 is a system diagram illustrating the outline of a compressing system according to a first modified example of the first embodiment of the invention.
Figure 4:
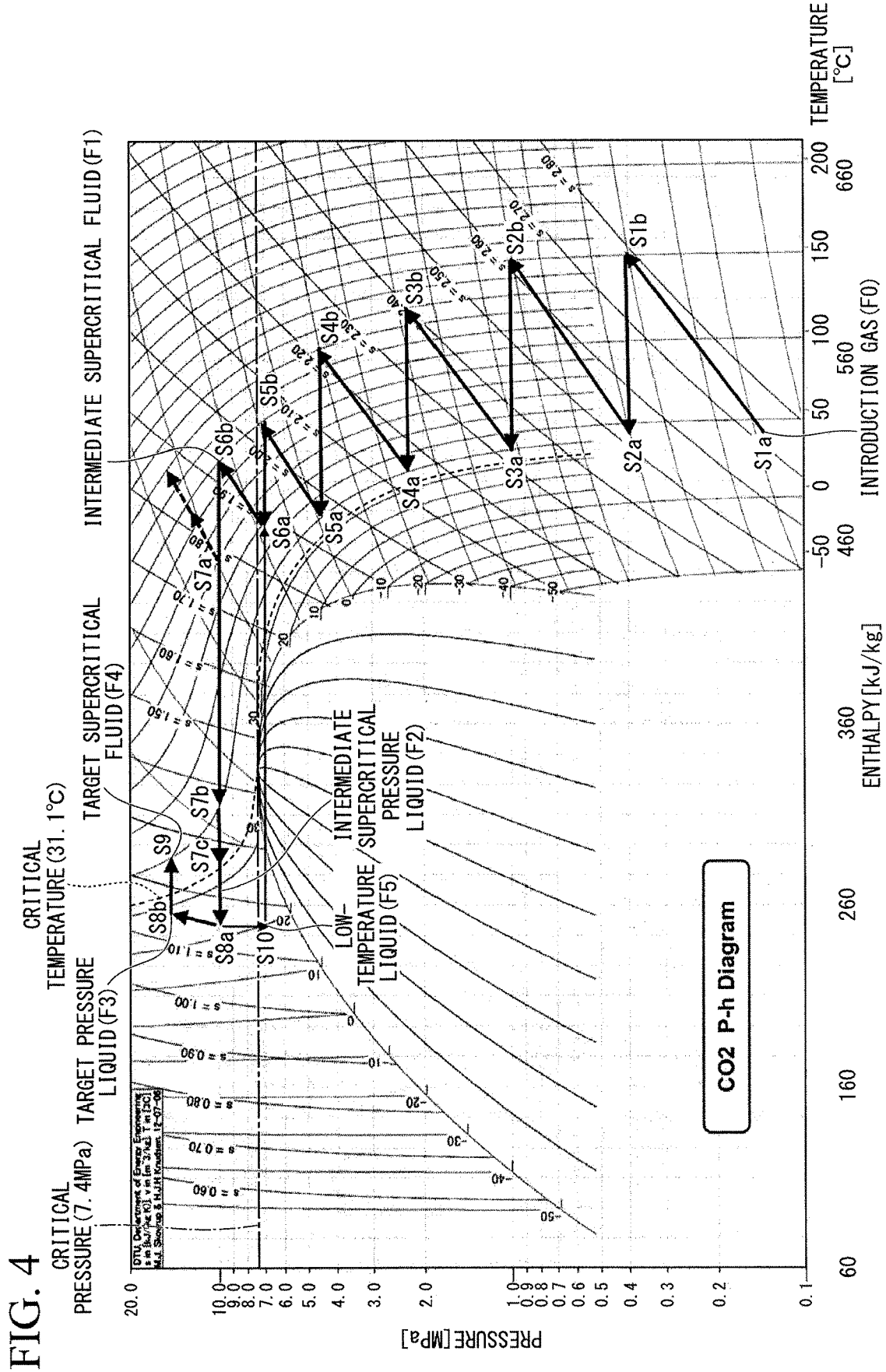
FIG. 4 is a P-h diagram illustrating the state of carbon dioxide regarding the compressing system according to the first modified example of the first embodiment of the invention.

In addition, in the present embodiment, the refrigerant of the main cooling part 28 is the low-temperature liquid F5 from the extracting and decompression section 6. However, in a case where a suitable cooling medium W is obtained from the outside, reduction of the amount of refrigeration required by the main cooling part 28 is possible by pre-cooling the intermediate supercritical fluid F1 by the pre-cooling part 29. For example, in this case, as shown in FIGS. 3 and 4, cooling from the state S7b to a state S7c is performed in the pre-cooling part 29, and cooling from the state S7c to the state S8a is performed in the main cooling part 28.

Accordingly, the cooling in the main cooling part 28 can be sufficiently performed even if the flow rate of the low-temperature liquid F5 is reduced by such a pre-cooling part 29. Hence, since the flow rate of the low-temperature liquid F5 returned to the compression section 2 via the bypass channel 7 can be reduced, power reduction in the compression section 2 is also possible, which leads to further improvement in operation efficiency.

Moreover, since the refrigerant of the main cooling part 28 is the low-temperature liquid F5, the refrigeration of the intermediate supercritical pressure liquid F2 itself introduced into the pumping section 3 is effectively used. That is, the intermediate supercritical pressure liquid F2 introduced into the pumping section 3 can be reliably generated without separately installing a condenser required to generate the intermediate supercritical pressure liquid F2 from the intermediate supercritical fluid F1.

Additionally, in the main cooling part 28, it is possible to cool the intermediate supercritical fluid F1 compressed in the compression section 2 to generate the intermediate supercritical pressure liquid F2 and introduce the intermediate supercritical pressure liquid F2 into the pumping section 3. Additionally, the intermediate supercritical pressure liquid F2 can be heated to the critical temperature or higher by performing heat exchange with the heating section 5 with respect to the heat recovered during the cooling of the intermediate supercritical fluid F1.

Additionally, since heat exchange is performed in a high-pressure state of the critical pressure or higher in the cooling of the intermediate supercritical fluid F1 in the cooling section 4 and the heating of the target pressure liquid F3 in the heating section 5, the heat exchange part can be made compact, and therefore, the overall system can be made compact.

By providing the bypass channel 7, the extracted intermediate supercritical pressure liquid F2 is no longer discharged to the outside. Therefore, the efficiency of the overall compressing system 1 can be further improved.

Figure 5:
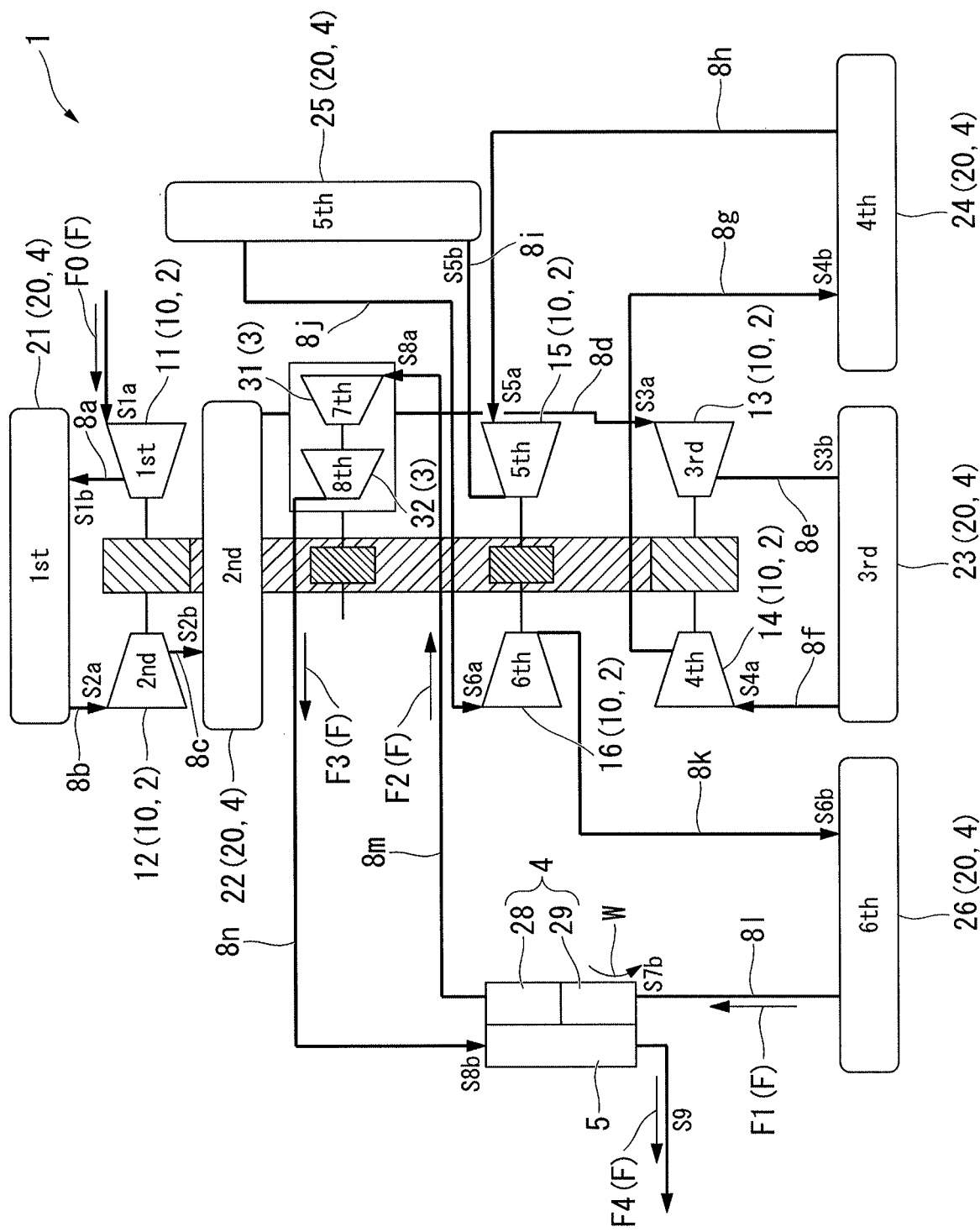
FIG. 5 is a system diagram illustrating the outline of a compressing system according to a second modified example of the first embodiment of the invention.

In addition, in the present embodiment, the extracting and decompression section 6 is not necessarily provided. In this case, as shown in FIG. 5, the cooling section 4 performs heat exchange only with the heating section 5, or performs heat exchange with the heating section 5 and the external cooling medium W.

Figure 6:
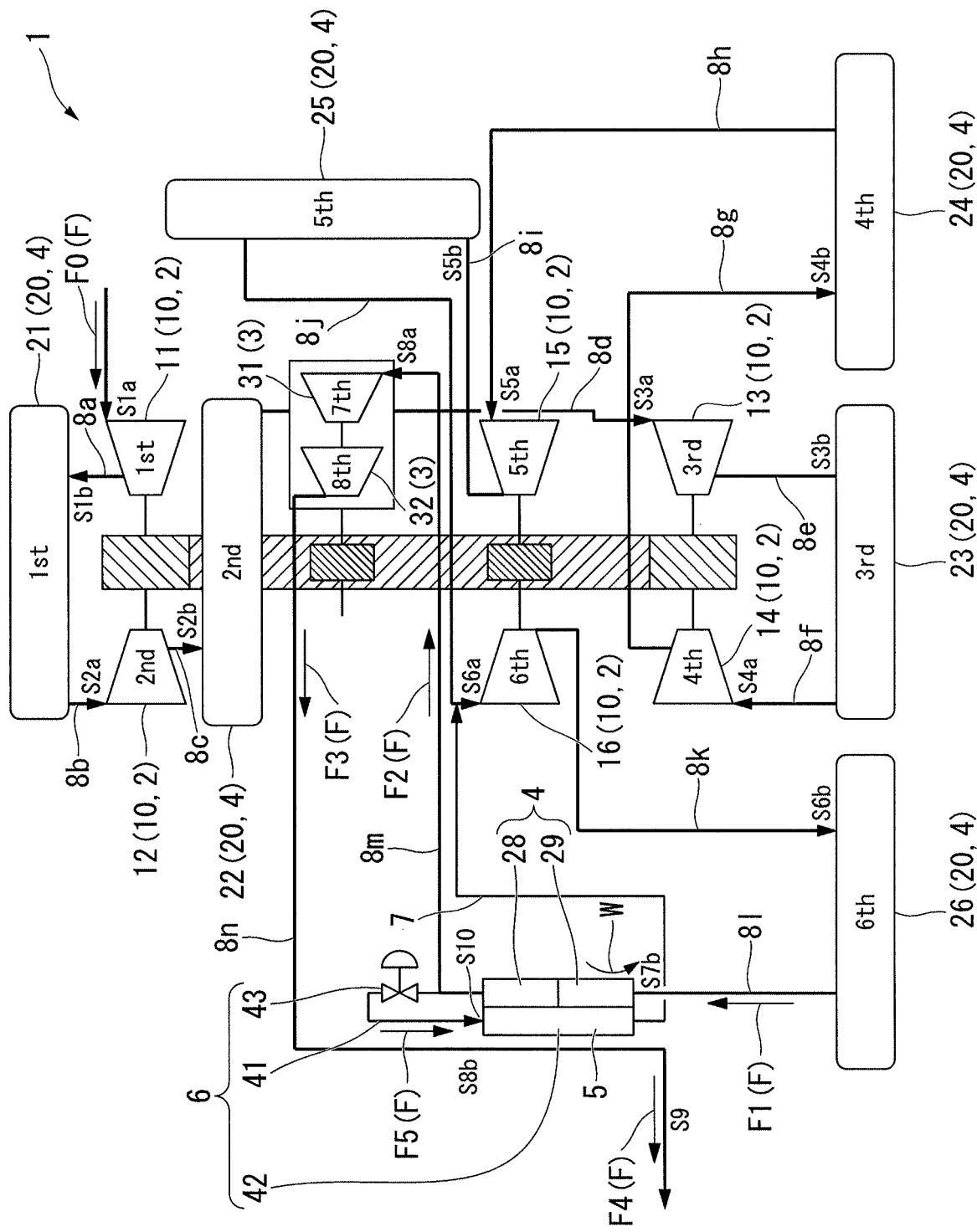
FIG. 6 is a system diagram illustrating the outline of a compressing system according to a third modified example of the first embodiment of the invention.

Additionally, in a case where a gas at target pressure or temperature can be obtained only by compressing in the pumping section 3 or in a case where a liquid state is desirable for the purpose of being stored in a container as a raw material of a process, the heating section 5 is not necessarily provided. In this case, as shown in FIG. 6, the cooling section 4 performs cooling by both the low-temperature liquid F5 in the extracting and decompression section 6 and external cooling medium W, or performs cooling by any one of these.

Next, a compressing system 1A according to a second embodiment of the invention will be described.

Constituent elements common to those of the first embodiment are designated by the same reference numerals, and a detailed description thereof is omitted here.

Figure 7:
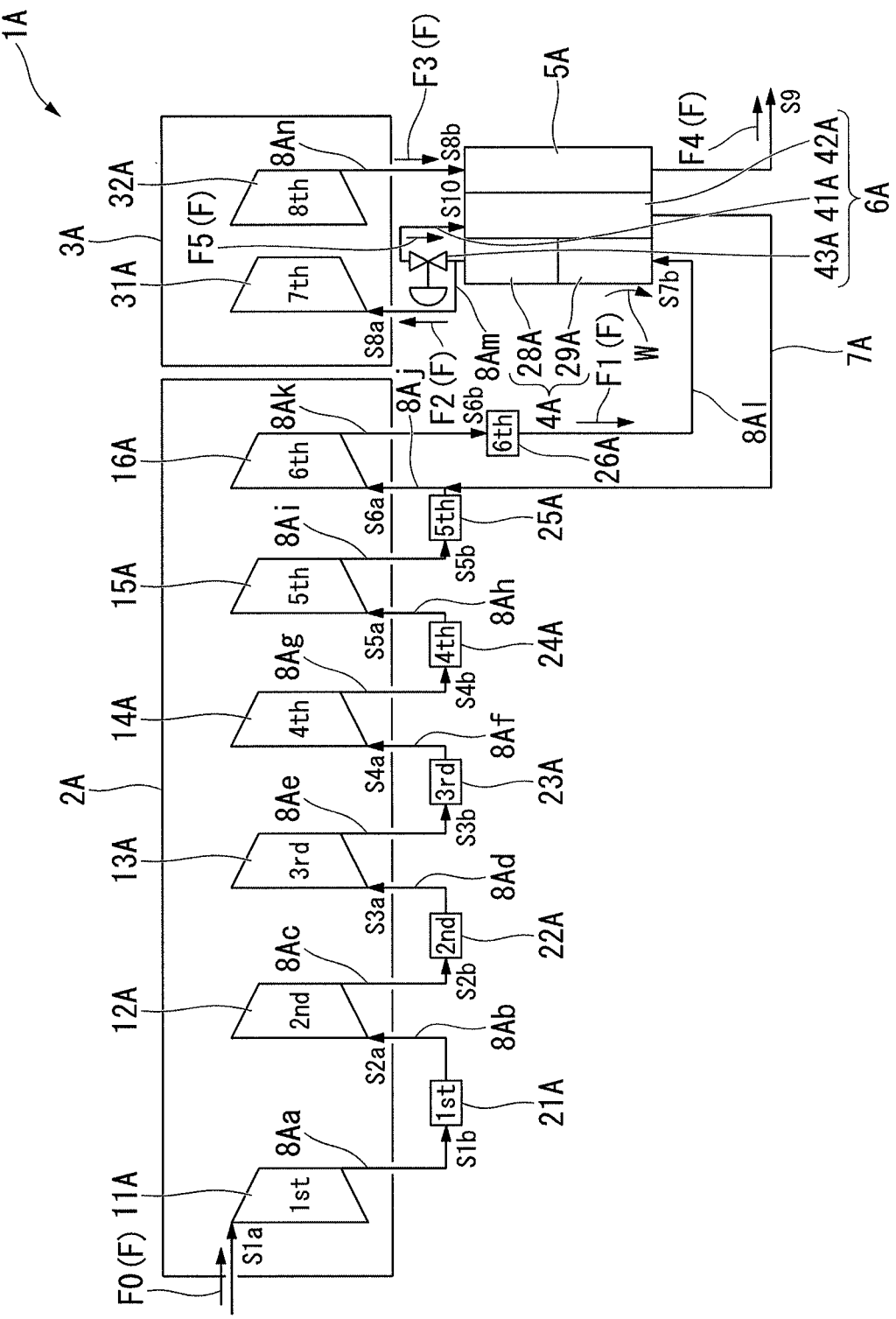
FIG. 7 is a system diagram illustrating the outline of a compressing system according to a second embodiment of the invention.

As shown in FIG. 7, the compressing system 1A of the present embodiment is a combination of an arbitrary compressor type (a centrifugal type, a reciprocal type, or the like) and a pump type.

The compressing system 1A, similar to the first embodiment, includes a compression section 2A, a pumping section 3A, a cooling section 4A, a heating section 5A, an extracting and decompression section 6A that has a branch conduit 41A, a heat exchange part 42A, and a valve 43A, and a bypass channel 7A. The compression section 2A, the pumping section 3A, the cooling section 4A, and the heating section 5A are connected to each other by conduits 8Aa, 8Ab, 8Ac, 8Ad, 8Ae, 8Af, 8Ag, 8Ah, 8Ai, 8Aj, 8Ak, 8Al, 8Am, and 8An.

The compression section 2A has a plurality of compression stages 11A to 16A that are provided in multiple stages (six stages in the present embodiment), and a plurality of intercoolers 21A to 26A each of which is provided between the compression stages 11A to 16A or between the compression section 2A and the cooling section 4A.

The pumping section 3A is provided in a rear stage of the compression section 2A, and is constituted of pump stages 31A and 32A in multiple stages (two stages in the present embodiment).

Here, the state S1a to the state S9 and the state S10 of the carbon dioxide F in FIG. 7 correspond to the state S1a to the state S9 and the state S10 of the carbon dioxide F in FIG. 2.

According to such a compressing system 1A, similar to the first embodiment, it is possible to combine the compression section 2A and the pumping section 3A to suppress costs and improve operation efficiency, and it is possible to adopt the cooling section 4A to perform cooling at a critical pressure or higher. Therefore, it is possible to further reduce the power required for liquefaction of the intermediate supercritical fluid F1.

Figure 8:
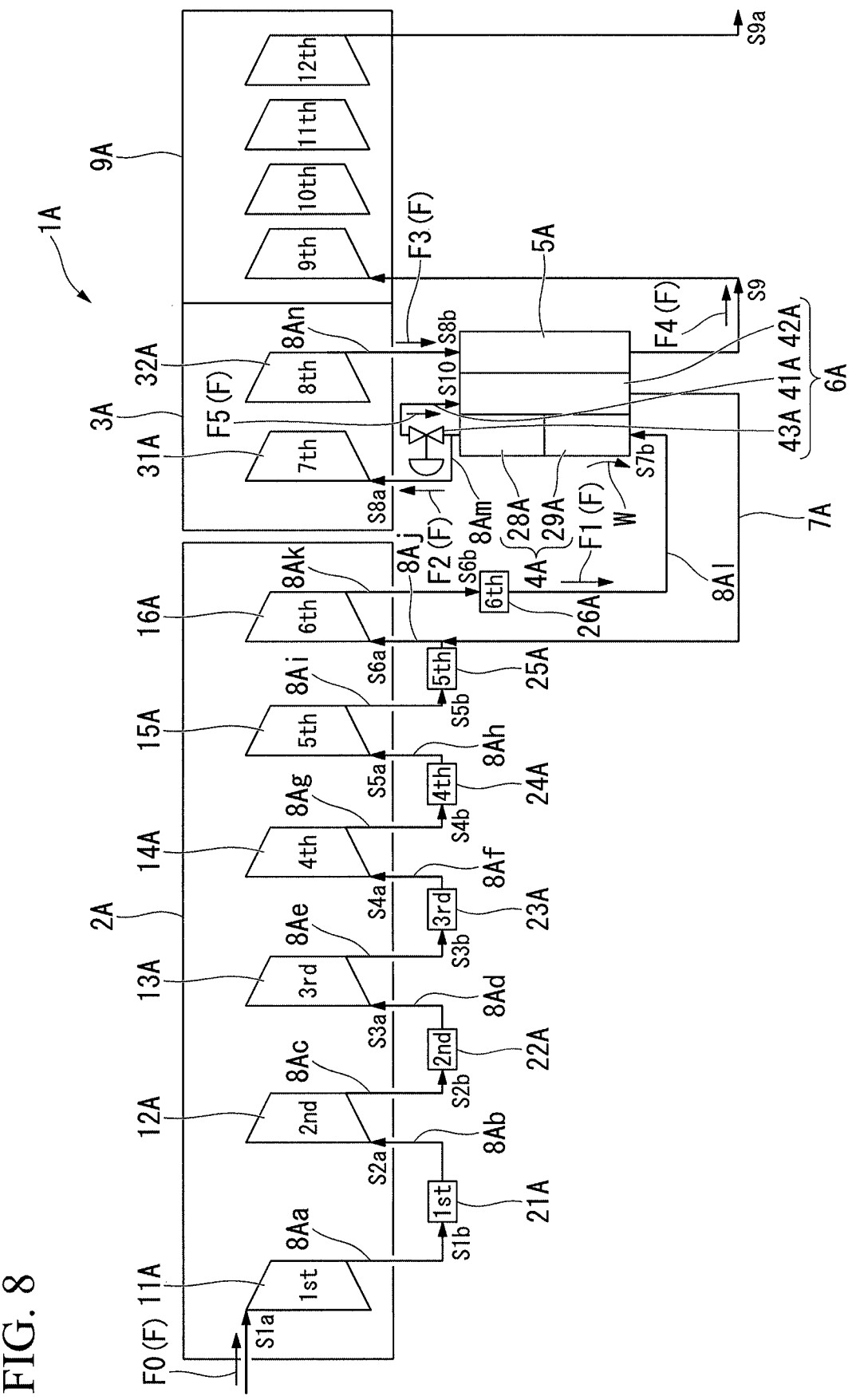
FIG. 8 is a system diagram illustrating the outline of a compressing system according to a modified example of the second embodiment of the invention.
Figure 9:
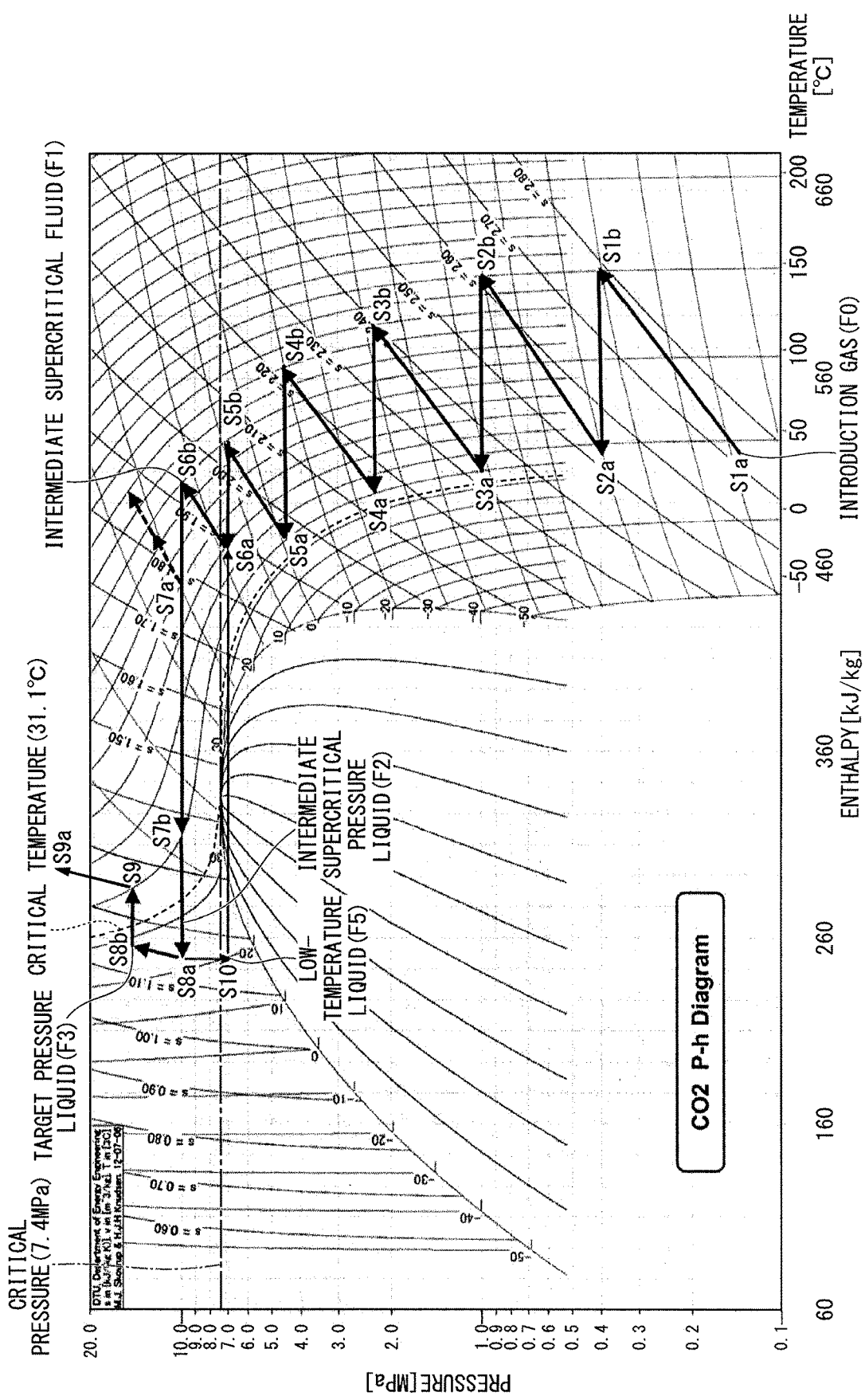
FIG. 9 is a P-h diagram illustrating the state of carbon dioxide regarding the compressing system according to the modified example of the second embodiment of the invention.

Here, as shown in FIG. 8, a pumping section 9A may be further provided on a rear-stage side of the pumping section 3A. By adopting such a configuration, it is also possible to add a pump stage to perform compressing to a higher pressure. In this case, as shown in FIG. 9, the state S9 of the carbon dioxide F becomes a state S9a, and a supercritical fluid at a pressure that is equal to or higher than a target pressure can be obtained.

In addition, even in the compressing system 1 of the first embodiment, the pumping section may be further added on the rear-stage side of the pumping section 3 in this way so as to compress the carbon dioxide F to a pressure that is equal to or higher than a target pressure.

Additionally, even in the present embodiment, the pre-cooling part 29A is not used in the cooling section 4A, and cooling is performed only by the main cooling part 28A. However, it is possible to perform pre-cooling by the pre-cooling part 29A to thereby reduce the amount of refrigeration required by the main cooling part 28A.

Although the preferred embodiments of the invention have been described, the invention is not limited to the above embodiments. Additions, omissions, substitutions, and other modifications of the configuration can be made without departing from the concept of the present invention. The invention is not to be considered as being limited by the foregoing description, and is limited only by the scope of the appended claims.

For example, although the main cooling part 28 (28A) in the cooling section 4 (4A) performs the cooling of the intermediate supercritical pressure liquid F2 by the low-temperature liquid F5 from the extracting and decompression section 6 (6A), the intermediate supercritical pressure liquid F2 may be cooled by a refrigerant from the outside, such as the external cooling medium W, similar to the pre-cooling part 29 (29A). Moreover, in the heating section 5 (5A), an external heater may be separately provided to heat the target pressure liquid F3 to generate the target supercritical fluid F4, that is, the cooling section 4 (4A) and the heating section 5 (5A) may be made to be independent. This can simplify the structure.

Additionally, the cooling medium of the intercoolers 21A to 26A may be air or the like without being limited to water.

Moreover, the bypass channel 7 (7A) is not necessarily provided. In this case, the compression section 2 (2A) can be designed without taking into consideration the flow rate of the low-temperature liquid F5 returned to the compression section 2 (2A).

Additionally, the number of stages of the compression section 2 (2A) and the pumping section 3 (3A) is not limited to the above-described embodiments.

Moreover, in the embodiments, the target gas is the carbon dioxide F. However, the target gas is not limited to this, and the compressing system 1 (1A) can be applied to compressing of various gases.

INDUSTRIAL APPLICABILITY

The present invention relates to a compressing system that performs compressing of gas. According to the compressing system of the invention, by combining the compression section and the pumping section and cooling the intermediate supercritical fluid in the state of a pressure that is equal to or higher than a critical pressure in the cooling section, power is further reduced, thereby operation efficiency is improved.

DESCRIPTION OF REFERENCE NUMERALS

1: COMPRESSING SYSTEM
2: COMPRESSION SECTION
3: PUMPING SECTION
4: COOLING SECTION
5: HEATING SECTION
6: EXTRACTING AND DECOMPRESSION SECTION
7: BYPASS CHANNEL
8a, 8b, 8c, 8d, 8e, 8f, 8g, 8h, 8i, 8j, 8k, 8l, 8m, 8n: CONDUIT
11: FIRST-STAGE COMPRESSION IMPELLER
12: SECOND-STAGE COMPRESSION IMPELLER
13: THIRD-STAGE COMPRESSION IMPELLER
14: FOURTH-STAGE COMPRESSION IMPELLER
15: FIFTH-STAGE COMPRESSION IMPELLER
16: SIXTH-STAGE COMPRESSION IMPELLER
20: INTERCOOLER
21: FIRST INTERCOOLER
22: SECOND INTERCOOLER
23: THIRD INTERCOOLER
24: FOURTH INTERCOOLER
25: FIFTH INTERCOOLER
26: SIXTH INTERCOOLER
F: CARBON DIOXIDE (TARGET GAS)
F0: INTRODUCTION GAS
F1: INTERMEDIATE SUPERCRITICAL FLUID
F2: INTERMEDIATE SUPERCRITICAL PRESSURE LIQUID
F3: TARGET PRESSURE LIQUID
F4: TARGET SUPERCRITICAL FLUID
F5: LOW-TEMPERATURE LIQUID
W: EXTERNAL COOLING MEDIUM

28: MAIN COOLING PART
29: PRE-COOLING PART
31: FIRST-STAGE PUMP IMPELLER
32: SECOND-STAGE PUMP IMPELLER
41: BRANCH CONDUIT
42: HEAT EXCHANGE PART
43: VALVE
1A: COMPRESSING SYSTEM
2A: COMPRESSION SECTION
3A: PUMPING SECTION
4A: COOLING SECTION
5A: HEATING SECTION
6A: EXTRACTING AND DECOMPRESSION SECTION
7A: BYPASS CHANNEL
8Aa, 8Ab, 8Ac, 8Ad, 8Ae, 8Af, 8Ag, 8Ah, 8Ai, 8Aj, 8Ak, 8Al, 8Am, 8An: CONDUIT
9A: PUMPING SECTION
11A, 12A, 13A, 14A, 15A, 16A: COMPRESSION STAGE
21A, 22A, 23A, 24A, 25A, 26A: INTERCOOLER
28A: MAIN COOLING PART
29A: PRE-COOLING PART
31A, 32A: PUMP STAGE
41A: BRANCH CONDUIT
42A: HEAT EXCHANGE PART
43A: VALVE

The invention claimed is:

1. A gas compressing method for compressing carbon dioxide as a target gas to a pressure higher than a critical pressure, the gas compressing method comprising:
    a repeating step including: a first step of compressing the carbon dioxide; and a second step of cooling the carbon dioxide compressed in the first step, the repeating step alternatively repeating the first step and the second step to compress the carbon dioxide to a first pressure that is equal to or higher than the critical pressure of the carbon dioxide to generate an intermediate supercritical fluid;
    a cooling step of cooling the intermediate supercritical fluid generated in the repeating step to a temperature range of ±20° C. from a critical temperature of the carbon dioxide to generate an intermediate supercritical pressure liquid;
    a pressure-reduction step of reducing a pressure of a portion of the intermediate supercritical pressure liquid extracted from a main flow of the intermediate supercritical pressure liquid generated in the cooling step to generate a low-temperature liquid; and
    a first pumping step of compressing a remaining portion of the main flow of the intermediate supercritical pressure liquid generated in the cooling step to a second pressure that is equal to or higher than the first pressure to generate a target pressure liquid;
    a heating step of isobarically raising the target pressure liquid generated in the first pumping step in temperature to the critical temperature of the carbon dioxide or higher to generate a target supercritical fluid; and
    a second pumping step of compressing the target supercritical fluid generated in the heating step to a third pressure that is equal to or higher than the second pressure to generate a supercritical fluid, wherein
    in the pressure-reduction step, the pressure of the portion of the intermediate supercritical pressure liquid is reduced by utilizing the Joule-Thomson effect to generate the low-temperature liquid, and
    the cooling step includes a main cooling step of cooling the intermediate supercritical fluid to the temperature range of ±20° C. from the critical temperature of the carbon dioxide using the low-temperature liquid generated in the pressure-reduction step.

2. The gas compressing method according to claim 1, wherein
    the cooling step further includes a pre-cooling step of cooling the intermediate supercritical fluid generated in the repeating step using an external cooling medium, and
    the pre-cooling step is performed before the main cooling step.

3. The gas compressing method according to claim 1, wherein
    in the heating step, the target pressure liquid is heated by a condensation heat that is obtained by cooling the intermediate supercritical fluid in the main cooling step to generate the target supercritical fluid.

* * * * *